(12) United States Patent
Spratt et al.

(10) Patent No.: US 6,272,147 B1
(45) Date of Patent: *Aug. 7, 2001

(54) METHOD AND APPARATUS FOR PRIORITIZED TRANSMISSION OF DATA OVER A NETWORK

(75) Inventors: Michael Peter Spratt, Bath (GB); Oran Sharon, Tivon (IL)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,119

(22) Filed: Sep. 26, 1997

(30) Foreign Application Priority Data

Sep. 27, 1996 (EP) .................................................. 96307200

(51) Int. Cl.⁷ ........................ H04L 12/407; H04L 12/413
(52) U.S. Cl. ............................................. 370/447; 370/461
(58) Field of Search .................................... 370/235, 236, 370/345, 347, 350, 433, 437, 443, 444, 445, 447, 451, 455, 458, 461

(56) References Cited

U.S. PATENT DOCUMENTS

| | | | | |
|---|---|---|---|---|
| 4,516,239 | * | 5/1985 | Maxemchuk | 370/347 |
| 4,623,886 | * | 11/1986 | Livington | 370/347 |
| 4,701,911 | * | 10/1987 | Ulug | 370/347 |
| 4,860,006 | | 8/1989 | Barall . | |
| 5,392,033 | * | 2/1995 | Oman et al. | 370/347 |
| 5,453,987 | * | 9/1995 | Tran | 370/347 |
| 5,535,212 | * | 7/1996 | Koopman et al. | 370/347 |

FOREIGN PATENT DOCUMENTS 0 140 077   5/1985  (EP) .

OTHER PUBLICATIONS

Pheonix Conference on Computers and Communications, Mar. 20–22, 1985, Scottsdale, Arizona, pp. 404–412, XP002025435 M.E. Ulug: "Alaysis of the Preemptive Contention Law" *p. 404, left-hand col., line 23 line 35 * *p. 404, right-hand col., line 20 p. 405, left-hand col., line 6* *p. 405, right-hand col., line 18 p. 406, left-hand col., line 21*.

Elektronik, vol. 31, No. 8, Apr. 1982, Munchen, Deutschland, pp. 67–70, XP002025436, Hubert Eing, Hans J. Wilhelmy: "Das SP–Netz—ein neus, Vielversprechendes lokales Netzwerk (LAN)" *p. 68, right-hand col., line 25—line 48* *figure 3*.

* cited by examiner

*Primary Examiner*—Wellington Chin
*Assistant Examiner*—Frank Duong

(57) ABSTRACT

In order to allow a data network, for example around the home, to carry real-time data such as digital video and digital audio, in addition to carrying data for example between a PC and a printer or ISDN router, and in order to permit the latter data to be handled in accordance with known protocols, such as the IEEE 802.3 CSMA/CD Ethernet protocol, the real-time data is handled on a high-priority basis. The high-priority stations, such as a digital television set, digital TV set-top box, digital VTR and CD player employ a contention resolution process which ensures that they succeed in accessing the network bus over any low-priority stations, and the high priority stations employ a fairness process which ensures that they take it in turns to access the bus.

18 Claims, 6 Drawing Sheets

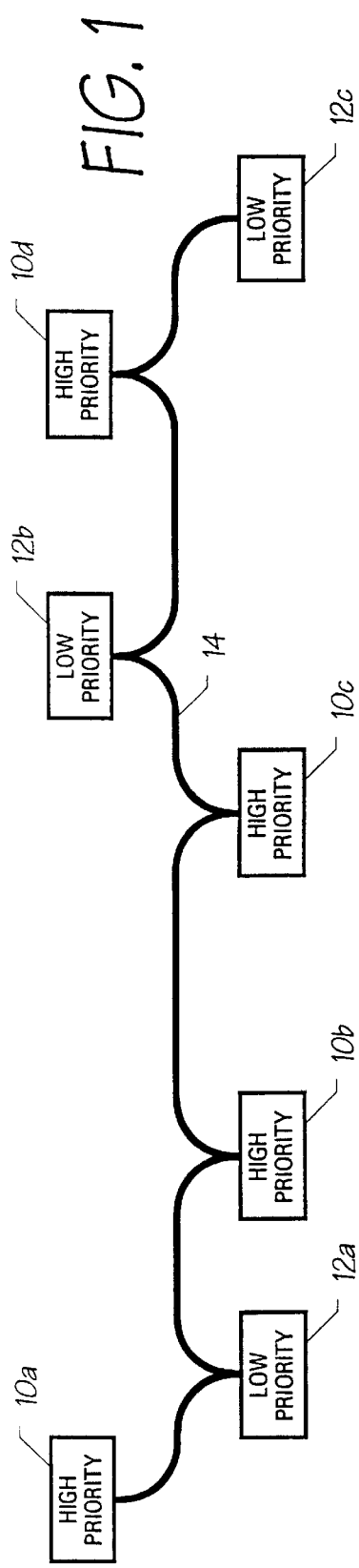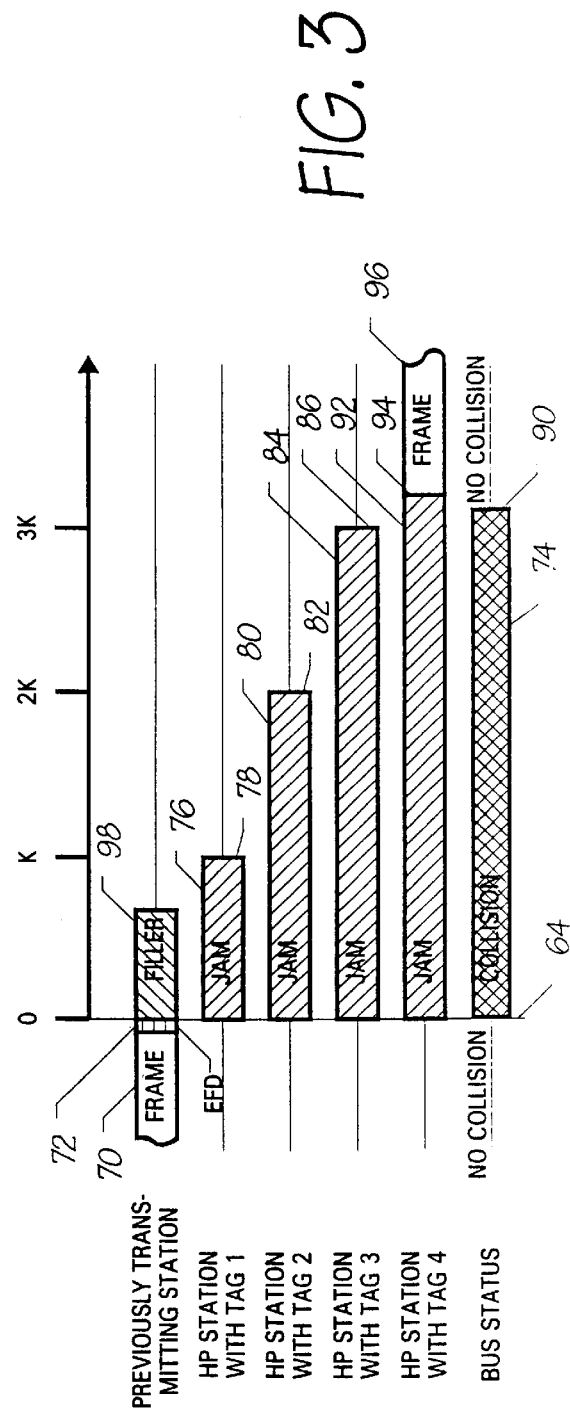

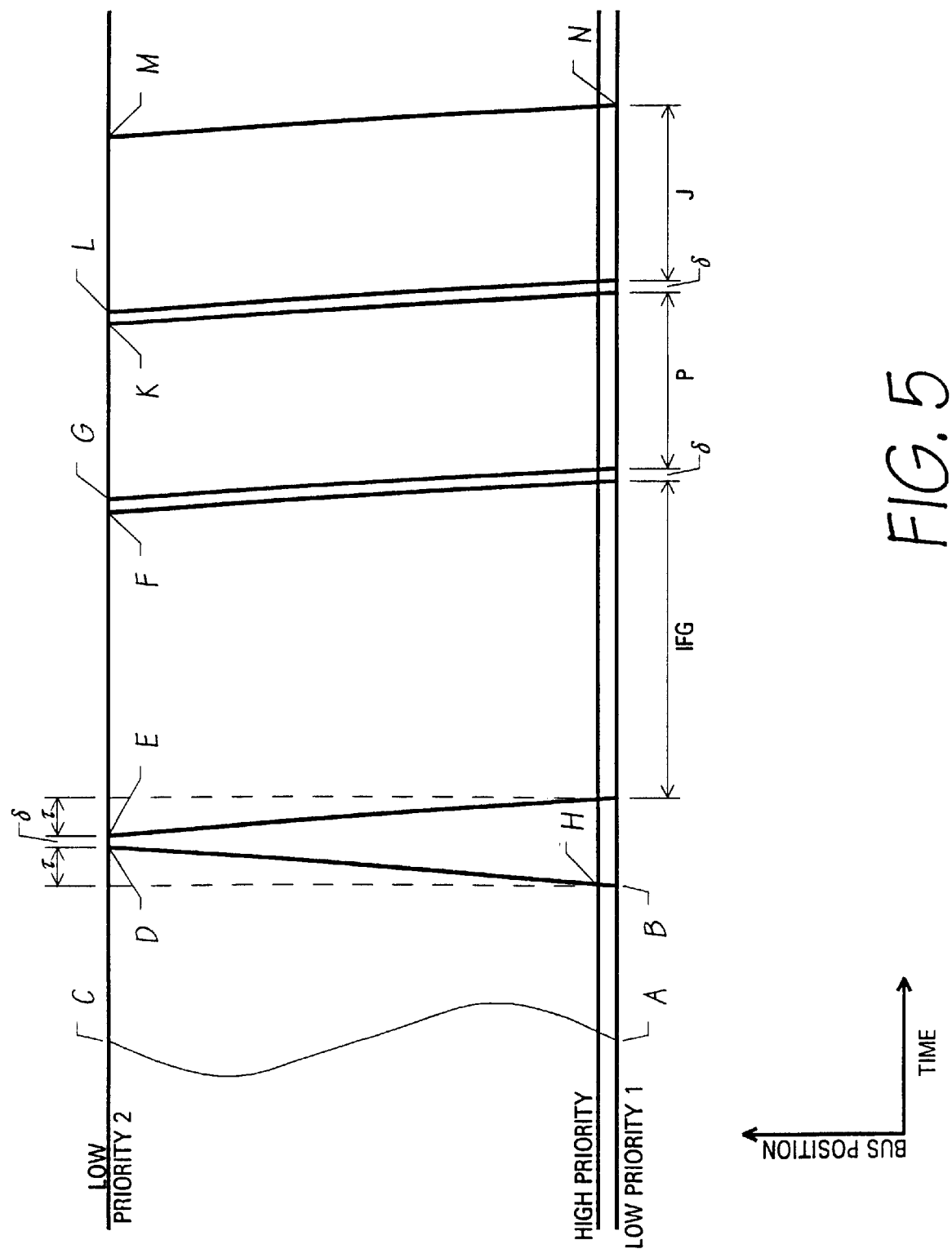

METHOD AND APPARATUS FOR PRIORITIZED TRANSMISSION OF DATA OVER A NETWORK

BACKGROUND OF THE INVENTION

This invention relates to data networks.

In the last 20 years, Local Area Networks (LANs) have revolutionised the way in which computers have been used in the work place, and have allowed personal computers ("PC"s) and the client/server paradigm to replace to a large extent the mainframe/terminal technology prior to LANs. In a similar way, in the last 10 years, the MIDI network has revolutionised the production and performance of music, and created a huge market in MIDI-compatible equipment.

In a similar way, a home LAN could help to revolutionise home equipment, by bringing together computing and electronic entertainment. Such a network might link around the home digital TVs, a set-top box, digital VCR, CD player producing digital audio, PC, printer and ISDN router. Currently, there are multiple standards bodies examining home LANs, but no really strong contender for home LAN technology has emerged, and most proposals seem to have some drawbacks. The proposals tend to concentrate on carrying just video traffic and are not compatible with the Ethernet interfaces which are already installed or being installed in large numbers in the home, to connect PCs to printers and ISDN routers. These proposals ignore the fact that Ethernet is very widespread.

SUMMARY OF THE INVENTION

The present invention, or at least certain embodiments of it, is concerned with enabling Ethernet compatible video transmission, allowing the same network to be used for piping video around the home as the transport of computer data, so that existing Ethernet cards of the home network can be used without modification. The present invention, or at least certain embodiments of it, achieves this by enabling video and the like to be transmitted on the Ethernet with higher priority. The present invention, or at least certain embodiments of it, is also concerned with allowing video to be transmitted with very low jitter. This is particularly important in interfaces to home appliances, where the extremely cost sensitive market means only minimal buffering at the receiver can be afforded to overcome network jitter. The present invention, or at least certain embodiments of it, is also concerned with providing a protocol which is simple, and/or implementable purely in hardware, and/or robust.

In accordance with a first aspect of the present invention, there is provided a method of operating a data network having a bus and a plurality of stations operable to transmit data on the bus, wherein: those stations which wish to transmit on the bus have respective rankings (e.g. 1, 2, 3, . . . ) and perform a contention resolution process whereby they transmit in cycles and within each cycle they transmit in an order determined from their rankings; and each station which wishes to transmit further data immediately after it has transmitted data in a current cycle refrains from the contention resolution process until it has determined that the current cycle has been completed. Thus, this aspect of the invention allows the stations to transmit in turn. It will be appreciated from the following description that not all of the stations on the network are necessarily arranged to operate in accordance with this aspect of the invention, but only what will hereinafter be referred to as "high-priority" stations, such as those transmitting digital video and audio.

It should be noted that in this specification, unless the context otherwise requires, "bus" is not limited to a bus employing a cable connection, and also includes any kind of shared communications channel, such as wireless buses employing, for example, radio or infra-red as a means of communication.

Preferably, the contention resolution process performed by each station prior to transmission of data on the bus comprises the steps of: transmitting a jam on the bus for up to a period of time dependent on the current ranking of that station; detecting whether there is a collision on the bus while transmitting the jam; and, if not, enabling transmission of data; and each station is operable to perform a fairness process, which comprises the steps of: detecting whether one of the stations has transmitted data succeeding a jam without a collision; and, if not, disabling its contention resolution process until such a detection has been made. This therefore provides an easily implementable protocol for contention resolution and fairness.

In order to deal with the possibility that a station may have taken part unsuccessfully in contention resolution, but then some change occurs which means that it no longer requires to transmit data, for example if that station is switched off, the fairness process of each station preferably comprises the further steps of: detecting whether its contention resolution process has been disabled for a predetermined period of time; and if so, re-enabling its contention resolution process.

The ranking of each station may be fixed, and this may provide reasonably efficient contention resolution if all of the stations are active all or most of the time. However, in order to allow the efficiency of the contention resolution process to adapt as stations become active and inactive, each station preferably performs a ranking allocation process prior to an initial transmission on the bus, which comprises the steps of: determining, from the bus, rankings currently in use by the other station(s); and allocating to itself a current ranking to one extreme of the determined rankings. In this case, the ranking allocation process performed by each station preferably comprises the further steps of: determining whether its current ranking is the same as that of the other station, or another of the stations; and, if so, recommencing its ranking allocation process. In order to deal with the problem that, if the error comes to light at the time of contention resolution, the rankings reallocated by the stations may also be the same, preferably the method further comprises the step of waiting for a pseudo-random period of time before the recommencement of the ranking allocation process. In order to reduce the delays which take place during contention resolution for stations with particular (e.g. "high") rankings, the ranking allocation process performed by each station preferably comprises the further steps of: detecting whether the ranking next to that station's current ranking in the direction towards the other extreme of the rankings (e.g. the lower direction) continues to be in use; and, if not, re-allocating to itself that other ranking as its current ranking.

A second aspect of the present invention provides a data network comprising a bus and a plurality of stations operable to transmit data on the bus, the stations being arranged to perform a method according to the first aspect of the invention.

A third aspect of the present invention provides a station adapted to form part of a network according to the second aspect of the invention.

As mentioned above, the stations may be thought of as high-priority stations, and the method of the first aspect of the invention may also involve at least one low-priority station which is operable to transmit data on the bus, the low-priority station(s) performing a different contention resolution process (for example in accordance with IEEE standard 802.3 CSMA/CD) to the high-priority stations.

In the case where the or each low-priority station is operable to perform a contention resolution process prior to transmission of data on the bus, the contention resolution process commencing when that station does not sense any activity on the bus, or a predetermined period of time after that station senses a transition from carrier to silence on the bus, or a predetermined period of time after that station has finished transmitting data, each high-priority station is preferably operable, immediately after transmission of data, to transmit a filler on the bus for a period of time exceeding said predetermined period(s) of time for the low-priority station(s).

This latter feature may be employed in methods other than in accordance with the first aspect of the invention. Therefore, according to a fourth aspect of the present invention, there is provided a method of operating a computer network having a bus, and a plurality of high-priority stations and at least one low-priority station each operable to transmit data on the bus, wherein: the or each low-priority station is operable to perform a contention resolution process prior to transmission of data on the bus (for example in accordance with IEEE standard 802.3 CSMA/CD), the contention resolution process commencing when that station does not sense any activity on the bus, or a predetermined period of time after that station senses a transition from carrier to silence on the bus, or predetermined period of time after that station has transmitted data; and each high-priority station is operable, immediately after transmission of data, to transmit a filler in the bus for a period of time exceeding said predetermined period(s) of time for the low-priority station(s).

Preferably, the or each low-priority station ceases transmission, at least temporarily, after transmission of data.

BRIEF DESCRIPTION OF THE DRAWINGS

A specific embodiment of the present invention will now be described by way of example with reference to the accompanying drawings, in which:

FIG. 1 illustrates a network having high-priority and low-priority stations;

FIG. 3 is a timing diagram illustrating contention resolution between high-priority stations on the network;

FIG. 4 comprising FIG. 5 is a time-space diagram illustrating contention resolution on the network after the transmission of a frame by a low-priority station, with time advancing in the x direction and position along the network bus shown in the y direction.

DETAILED DESCRIPTION OF THE INVENTION

Referring to FIG. 1, a network comprises a plurality of high-priority stations 10a, 10b, 10c, 10d and a plurality of low-priority stations 12a, 12b, 12c, connected by Ethernet cable 14. The low-priority stations 12a etc. might include an IBM-compatible PC, a printer and an ISDN router having conventional network hardware and software and operating in a conventional manner in accordance with the IEEE 802.3 CSMA/CD standard. The high-priority stations 10a etc. might include a digital television set, a digital TV set-top box, a digital video recorder/player and a CD player producing digital audio.

The stations 10a, 10b, 10c, 10d are termed "high-priority" stations because they employ a contention resolution protocol which gives them priority on the network over the low-priority stations 12a etc. The contention resolution protocol of the high-priority stations also ensures fairness amongst themselves.

Figure 2:
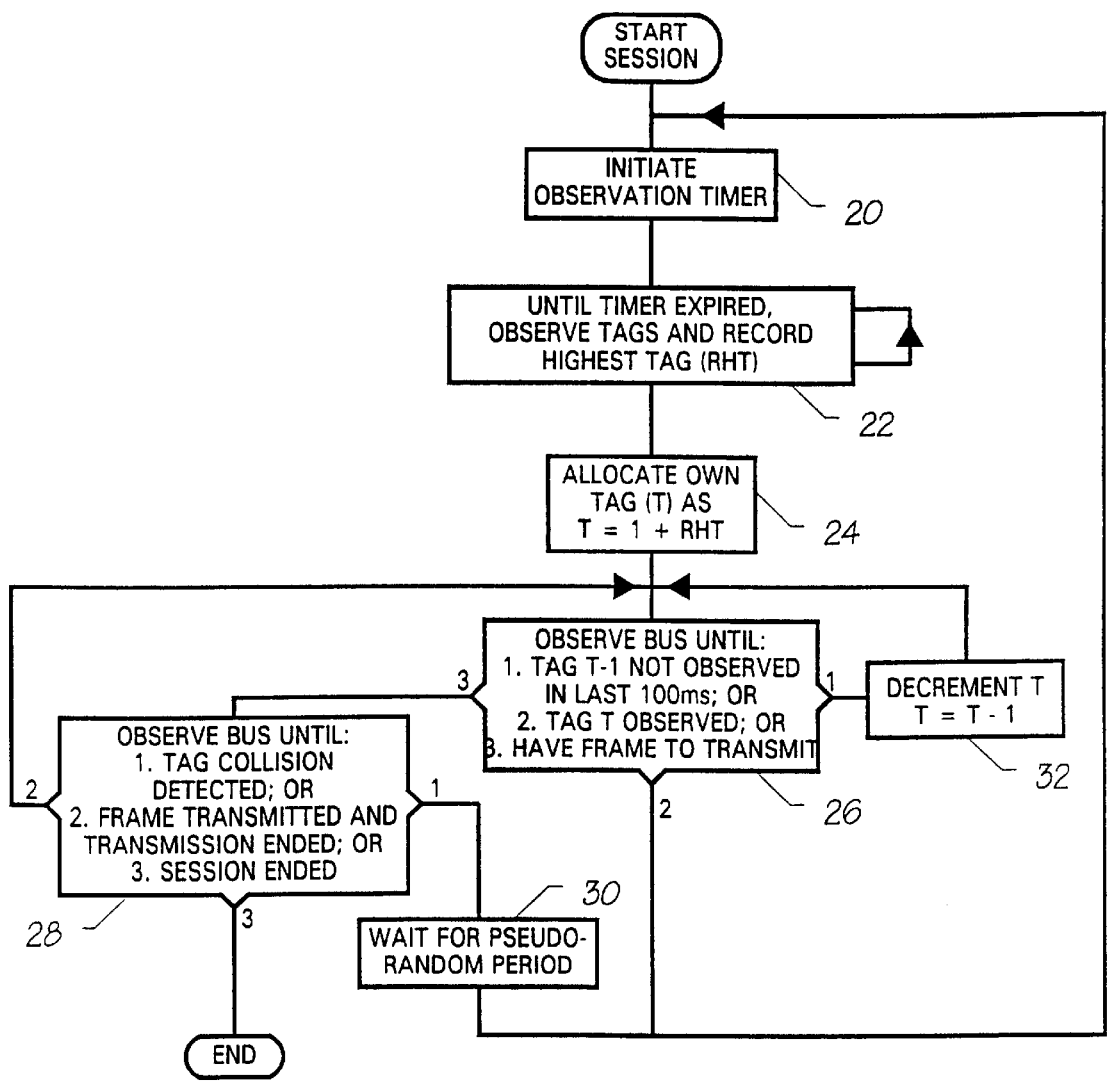
FIG. 2 is a flow diagram showing a tag allocation and re-allocation process performed by high-priority stations on the network.

The high-priority contention resolution protocol employs "tags", which are numbers 1, 2, 3 . . . and which appear as a field in a high-priority frame. The allocation of tags by each high-priority station will now be described with reference to FIG. 2. When a high-priority station wishes to initiate a session/connection to the network, in steps 20 and 22 it observes the network for a predetermined observation period such as 100 ms and observes the tags, if any, which are currently in use by the other high-priority stations, and records the highest tag ("RHT") which is in use. If no other high-priority stations are active, then an RHT of zero is recorded. In step 24, the high-priority station allocates to itself a tag T which is one higher than the recorded highest tag RHT. The observation period of 100 ms prevents a high-priority station possibly losing its tag place in the order to another high-priority station, provided that it transmits every 100 ms or less. This would typically be the case if video or audio were transmitted at high priority. If necessary the figure of 100 ms could be adjusted upwards, for example to accommodate stream-type applications which could have inter-transmission gaps of more than 100 ms.

Once allocated, a high-priority station's tag T may change. As shown by steps 26 and 28, if the station is transmitting and it detects a tag collision, the process returns to step 20, after a pseudo-random delay provided in step 30, and the station's tag is re-allocated from scratch. A tag collision might be detected, in this case, if the station reaches the end of a long jam (described below) while still detecting a collision, and then stops transmitting but observes that no other high-priority station continues by sending a frame. The pseudo-random delay is introduced by step 30 in order to reduce the chances that the stations whose tags have collided will both allocate themselves the same tag in the subsequent steps 20 to 24.

As shown by step 26, the station's tag is also re-allocated from scratch if it is not transmitting and it observes that another high-priority station is using its tag T. In this case, there is no need for a pseudo-random delay, because the other station can continue without re-allocating its tag.

As shown by steps 26, 32, if a station is not transmitting, and it observes that no other high-priority station has transmitted within a predetermined preceding period, such as 100 ms, with a tag T−1 one less than its own tag T, then it decrements its own tag by one, ie T becomes T−1, but not if its previous tag was one. Thus, the tags tend to float down to fill the lowest available numbers from 1 upwards.

TABLE 1

| Station | 10a | 10b | 10c | 10d |
| --- | --- | --- | --- | --- |
| Initially | 1 | 2 | 3 | 4 |
| 10b stops transmitting | 1 |   | 3 | 4 |
| 100 ms later | 1 |   | 2 | 4 |
| A further 100 ms later | 1 |   | 2 | 3 |

For example, as shown in Table 1, the high-priority stations 10a, 10b, 10c, 10d at one stage have tags 1, 2, 3, 4, respectively. Station 10b then stops transmitting frames, so that the active tags are 1, 3, 4 for stations 10a, 10c, 10d, respectively. About 100 ms later, station 10c has observed that tag 2 is spare and re-allocates its tag from 3 to 2. Then, about 100 ms after that, station 10d has observed that tag 3 is spare and reallocates its tag from 4 to 3.

The tags which are allocated and reallocated in the manner described above are used in contention resolution between the high-priority stations. FIG. 3 shows a situation where a high-priority station is completing transmission of a frame 70, and four high-priority stations with tags 1, 2, 3, 4 are contending for transmission.

At the end of its frame 70, the station which is transmitting transmits an end-of-frame delimiter field EFD 72. As shown in step 40 of FIG. 4A, each of the high-priority stations wishing to transmit detects the EFD and in step 42 initiates a respective long jam timer with a value K.T, where T is the respective tag, and K is a system constant which is chosen in dependence upon the propagation delay from one end of the network to the other and the time to detect a collision. In particular, K is preferably equal to or slightly greater than $2.(\tau+\delta)$, where $\tau$ is the one-way end-to-end propagation delay of the network and $\delta$ is the maximum time for a high-priority station to detect an important transition on the network such as between carrier and silence, or between collision and no collision. (A jam which is transmitted on the network for a period of $K \geq 2.(\tau+\delta)$ is referred to in this specification as a "long jam.")

At step 44, each contending station starts to transmit a jam. As will be seen from steps 46, 48, each of the contending stations will transmit a jam for no longer than its tag T multiplied by the basic long jam period K. If, at step 46, one of the stations which is transmitting a jam detects that there has not been a collision on the network bus, then in step 50 it sets its high-priority collision flag HPCF to false (for a reason to be explained below), and then in steps 52, 54 ceases to transmit the jam and proceeds with transmitting its preamble and frame. If, at step 46, the high-priority station detects that there has been a collision on the bus which has ceased, then in step 56 it sets its HPCF to true, and then proceeds with the steps 52, 54 of ceasing the jam and transmitting its preamble and frame.

From the above and referring in particular to FIG. 3, it can be seen that the stations with tags 1, 2, 3, 4 start transmitting jams substantially simultaneously at step 44 when they each detect the end-of-frame delimiter EFD 72 for the previously transmitted frame 70, and there is therefore a collision 74 on the network. The station with tag 1 ceases transmitting its jam 76 a period K later at time 78, but the stations with tags 2, 3, 4 continue to cause the collision 74. The station with tag 2 ceases transmitting its jam 80 a further period K later at time 82, but the stations with tags 3, 4 continue to cause the collision 74. The station with tag 3 ceases transmitting its jam 84 a further period K later at time 86. The consequent cease of a collision on the network at time 90 is detected by the station with tag 4, and therefore as a result of steps 46, 56, 52, 54 (FIG. 4), it ceases to transmit its jam 92 at time 94 and proceeds with transmitting its preamble and frame 96. After the frame has been transmitted, the high-priority station transmits the end-of-frame delimiter EFD, as shown in step 58 in FIG. 4B and initiates its long jam timer in step 60 in preparation for the possibility of transmitting another high-priority frame.

Having described how the high-priority stations 10a–d contend for access to the network, there now follows a description of how the low-priority stations 12a–c are prevented from transmitting while the high-priority stations are persisting with transmissions. As mentioned above, the low-priority stations 10a–d operate in a conventional manner in accordance with the IEEE 802.3 CSMA/CD standard. That standard prescribes that a station can only start to transmit on the network in one of the following circumstances:

1. In a period when the station does not sense any activity on the network.
2. When an inter frame gap (IFG) expires after the station senses a transition from carrier to silence on the network. (The IFG is defined in the standard as being the period of 96 bits, i.e. 9.6 $\mu$s.)
3. When an IFG expires after the station has transmitted a frame.

Figure 4A:
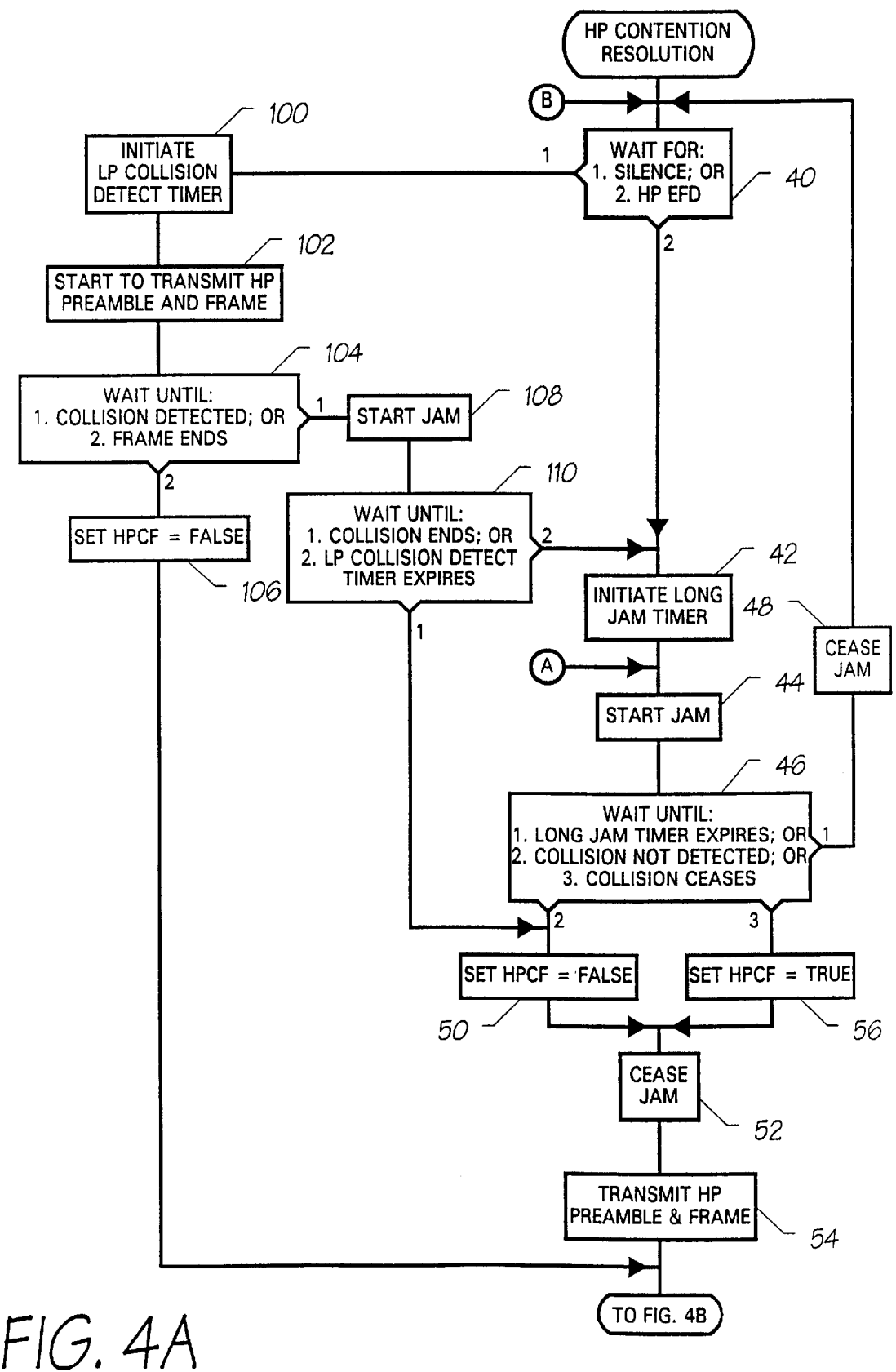
FIGS. 4A and 4B is a flow diagram showing a contention resolution process performed by each of the high-priority stations on the network.
Figure 4B:
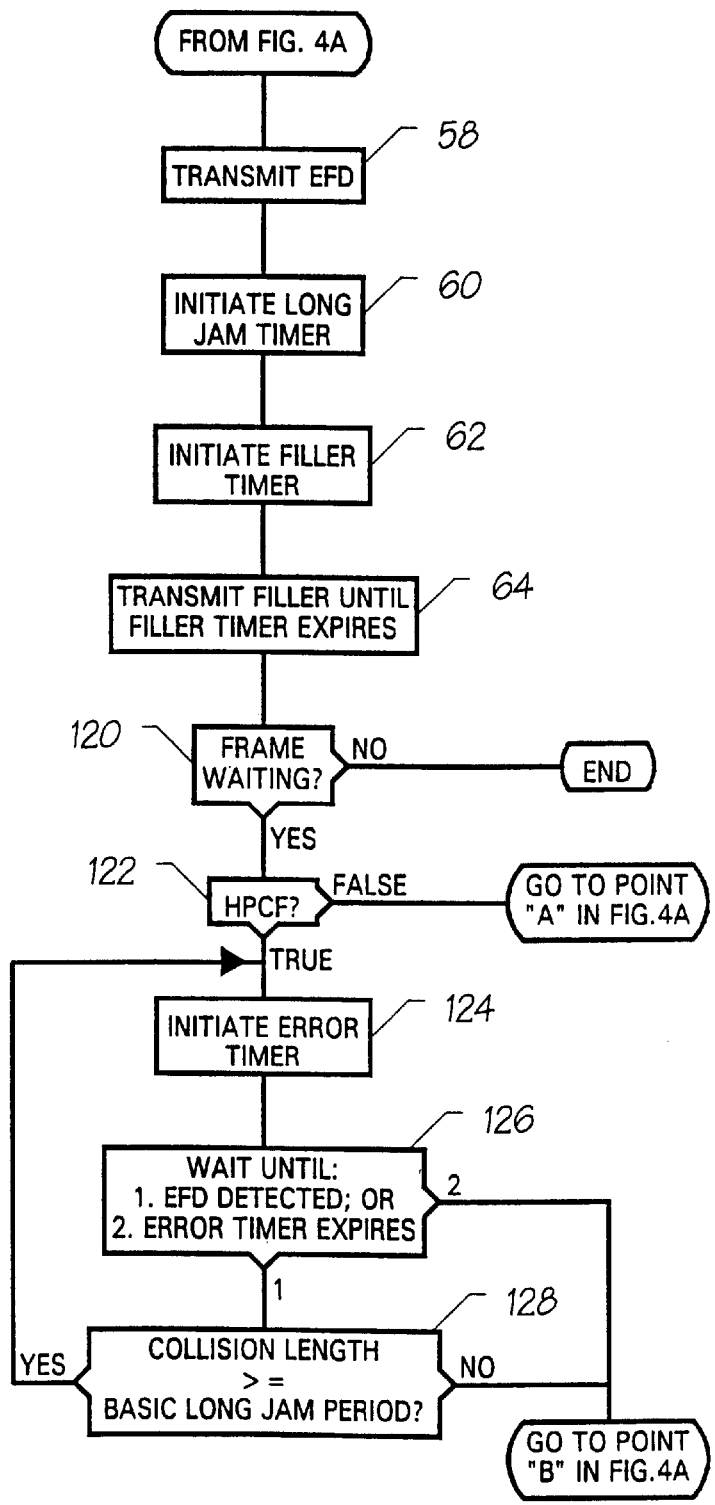

In order to ensure that a low-priority station does not start to contend for the network when a high-priority frame has been transmitted and other high-priority frames are waiting to be transmitted, the high-priority stations start contending for the network at time 44 in response to the EFD 72, but the station which has transmitted a frame continues after the EFD 72 to transmit a filler 98 for a predetermined period, which is less than a basic long jam period K but at least $2\tau$, as shown in steps 62, 64 in FIG. 4B. Thus, the filler period is sufficiently long that, despite propagation delays on the bus, none of the stations will detect a period of silence on the bus. Therefore the low-priority stations do not have an opportunity to contend for access to the network.

Having described contention resolution between high and low-priority stations after transmission of a high-priority frame, there now follows a description, with reference to FIG. 5 and the remainder of FIG. 4A, of contention resolution between stations after transmission of a frame by a low-priority station. Unlike a high-priority frame, after transmission of a low-priority frame there silence and no EFD and no filler.

A high-priority station wishing to transmit, upon detecting the silence in step 40, initiates a respective low-priority collision detect timer in step 100 with a value of IFG+P+J+$2.\tau$+$3.\delta$, where IFG, $\tau$ and $\delta$ are as described above, and where P is the preamble period for a low-priority frame and J is the jam period for a low-priority frame. In step 102, the high-priority station then starts to transmit its preamble and frame. In step 104, the high-priority station observes the bus while it is transmitting. If the frame end is reached without a collision, then the high priority collision flag is set to false in step 106, and the process proceeds to step 58 in FIG. 4B. If, however, a collision is detected in step 104 in FIG. 4A while the preamble or frame is being transmitted, in step 108 the high-priority station starts to transmit a jam, and then in step 110 waits for the collision to end or for the low-priority collision detect timer to expire. If the collision ceases before the timer expires, this indicates that the collision was with one or more low-priority stations, and the high-priority station proceed to step 50 where its high-priority collision flag is set to false, and then to steps 52, 54 where the jam ceases and the high-priority preamble and frame are re-transmitted. On the other hand, if in step 110 the timer expires before the collision ceases, this indicates that the collision was caused at least in part by another high-priority station. The process therefore proceeds to step 42 and a contention resolution process takes place between the high-priority stations, as described above.

FIG. 5 shows the case where two low-priority stations 1 and 2 are situated at opposite ends of the network bus, and a high-priority station is situated near the low-priority station. The low-priority station 1 is finishing transmitting a frame at point B. The end of the frame reaches the other end of the bus at point D, a period $\tau$ later. The low-priority station 2 senses the transition from carrier to silence and starts its inter frame gap timer at point E, a period $\delta$ later. At point F, the inter frame gap timer of the low-priority station 2 expires, a period IFG later, and at point G, a period $\delta$ later the low-priority station 2 starts to transmit its preamble for a period P.

Meanwhile, the end of the low-priority frame passed the high-priority station at point H and silence began, and the high-priority station therefore has started to transmit a preamble and then a jam (not shown in FIG. 5) as a result of steps 40, 102, 104, 108 in FIG. 4A. Accordingly, there is a collision for the low-priority station 2 at point K at the end of its preamble, and therefore in accordance with the IEEE 802.3 CSMA/CD standard it may start to transmit a jam at point L, a period $\delta$ later, if there is a frame waiting. The jam of the low-priority station continues for a period J, whereupon the low-priority station ceases contending for the bus at point M, and the end of the jam reaches the other end of the bus at point N. Since the high-priority station is situated near the other end of the bus, it can therefore be seen from FIG. 5 that in order for the high-priority station to succeed over the low-priority stations, the value set in its low-priority collision detect timer in step 100 of FIG. 4A needs to be at least as great as $\tau+\delta+\tau+IFG+\delta+P+\delta+J$, or as mentioned above $IFG+P+J+2.\tau+3.\delta$.

In order to ensure fairness between the high-priority stations during contention resolution, there now follows a description of the purpose of the high-priority contention flags HPCF which were set to true or false in steps 50, 56, 106 in FIG. 4A.

Referring to the remainder of FIG. 4B, when a high-priority station, which has just transmitted a frame, has finished transmitting its filler in step 64, it determines in step 120 whether it has another frame waiting to be transmitted, and if so it determines in step 122 whether its HPCF is set to true or false. As mentioned above, if false, this indicates that the high-priority station did not contend with another high-priority station for access to the bus prior to transmitting its last frame, and in this case the process proceeds to step 44 in FIG. 4A, where the high-priority station contends with any other high-priority stations which may, by now, require access to the bus. However, if the HPCF is true, then in step 124 the high-priority station initiates an error timer with a value greater than the time taken for a high-priority contention resolution process and transmission of a high-priority preamble and frame.

Subsequently, in step 126, the high-priority station observes the bus and waits for an end of frame delimiter EFD or for the error timer to expire. If the timer expires, this indicates that the other high-priority station(s) which contended for access to the bus before the previous frame was transmitted no longer requires access (for example if it has been switched off). In this case, the process proceeds to step 40 in FIG. 4A, where the high-priority station can start from scratch in contending for access to the bus. If, however, an EFD is detected in step 126, then in step 128 the high-priority station observes the bus and detects whether the length of any collision following the frame is at least as long as a basic long jam period K. If so, as will be appreciated from the description with reference to FIG. 3, this indicates that two or more other high-priority stations are contending for access to the bus, and the process proceeds back to step 124 so that the station defers contending for access to the bus. However, if in step 128, the detected collision length is less than the basic long jam period K, this indicates that there is only one (or possibly no) other high-priority station contending for access to the bus, and the process proceeds to step 40 in FIG. 4A so that the high-priority station can contend for access to the bus after that other high-priority station has transmitted its frame.

Accordingly, round robin fairness is provided. As an example, suppose that high-priority stations A to C have tags 1 to 3, respectively. When they first contend, A to C collide and C wins because it has the highest tag. C transmits its frame and sets its HPCF to true. Therefore C does not take part in the next contention resolution process, in which A and B collide, and B wins because it has the highest tag. B transmits its frame and sets its HPCF to true. Therefore both B and C do not take part in the next contention resolution process, in which A's jam is less than a basic long jam period K. A transmits its frame, and B and C (assuming they wish to transmit another frame) wait for the EFD of A's frame, so that at the end of that frame all of the stations A, B, C contend for access to the bus.

As explained previously, the primary purpose of the tag field is to enable resolution of contention between the high-priority stations. However, the tag field may also be used for other purposes. In the case where, the high-priority stations transmit with an Ethernet/IEEE 802.3 frame format, a sending station in general identifies itself with a unique source address. However, in the low-cost environment of consumer appliances, it may not be thought appropriate to assign individual unique source addresses to every station. Thus, for example, every Sony model III digital VCR might share the same source address A, and every Philips Mark 2 set top box might share the same address B. This is not a problem if the Sony Model III and the Philips Mark 2 are on the same network, but if there are two Philips Mark 2 models connected to the same network, there is an issue as to how a receiver would distinguish the frames from the two identical models with the two identical source addresses. The tags which would, as described above, be allocated as being different on the two identical machines could therefore be used as a simple way of distinguishing between the machines.

Under the IEEE 802 protocol, each station has a 48-bit address. Preferably, the high-priority stations are allocated addresses in a particular range of the 48-bit addressing space, so that the low-priority stations are outside that range and never attempt to receive the high-priority packets on the network. Also the first few bits of each high-priority station's address preferably have a particular bit pattern so that the high-priority stations can also very quickly work out which are high-priority frames.

Figure 6:
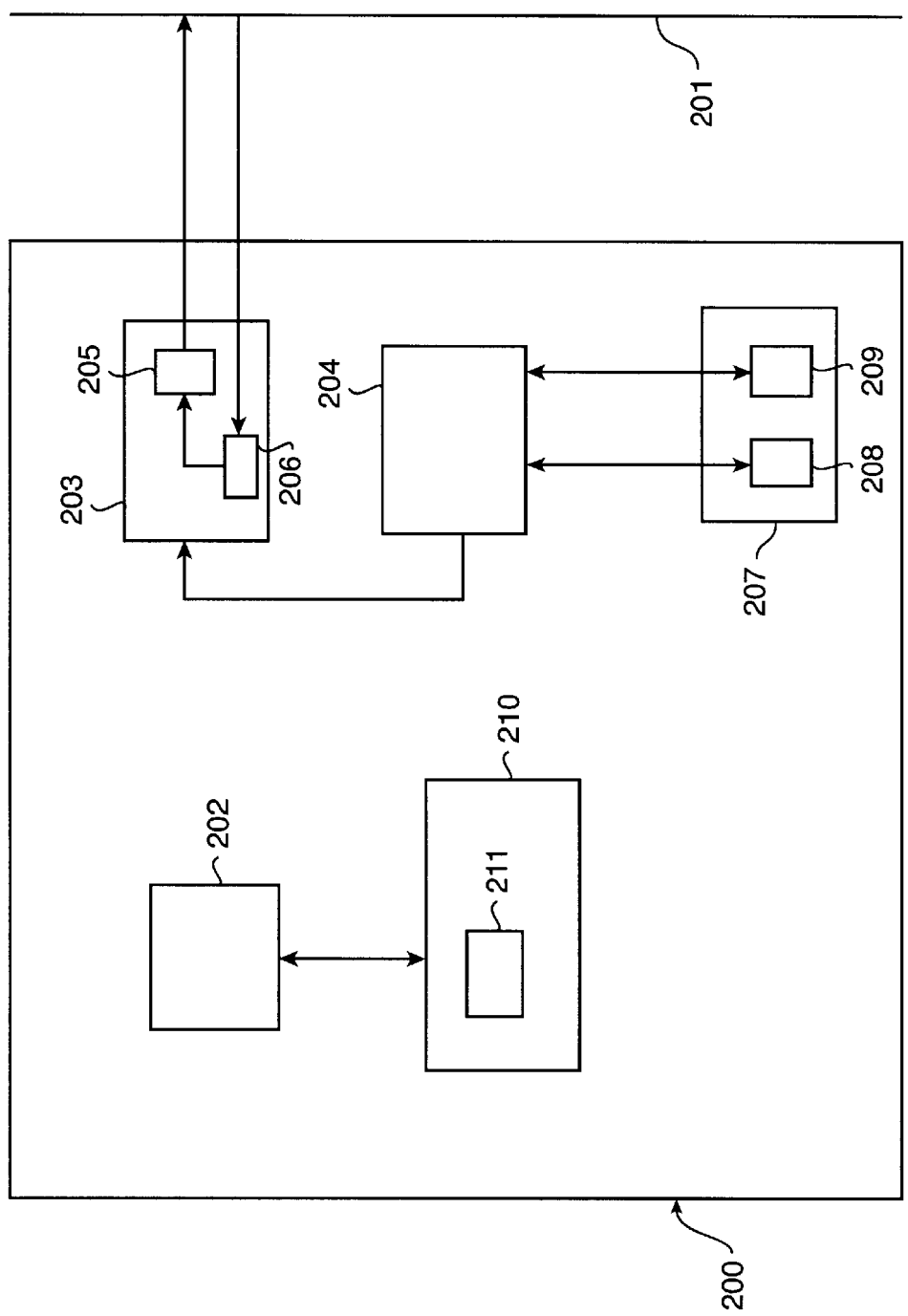
FIG. 6 is a block diagram illustrating a station for transmitting data over a network.

FIG. 6 schematically shows a station 200 for transmitting data over a network having a bus 201. The station 200 comprises storage means 202 for storing a respective ranking for the station 200. The station 200 also comprises contention resolution means 203 for performing a process whereby the station 200 transmits with other stations in cycles, and within each cycle the station 200 transmits in an order relative to those other stations determined from its stored ranking. The station 200 also comprises disabling means 204 for disabling the contention resolution means 203 in the event that the station 200 wishes to transmit further data immediately after it has transmitted data in a current cycle, until the current cycle has been completed.

More particularly the contention resolution means 203 comprises a transmitter 205 for transmitting a jam on the bus 201 for up to a period of time dependent on the current ranking of the station 200. The contention resolution means 203 further comprises a detector 206 for detecting whether there is a collision on the bus 201 while the transmitter 205 is transmitting the jam, and, if there is no collision, enabling transmission of data.

Each station 200 preferably includes fairness means 207 comprising a second detector 208 for detecting whether a station on the network has transmitted data succeeding a jam without a collision, and, if not, activating the disabling means 204 until such a detection has been made.

More in particular, the fairness means 207 comprises a third detector 209 for detecting whether the disabling means 204 has been activated for a predetermined period of time, and if so de-activating it.

The station 200 preferably comprises ranking means 210 for performing a ranking allocation process prior to an initial transmission on the bus 201, by determining, from the bus 201, rankings currently in use by other station(s), and by allocating to its station a current ranking to one extreme of the determined rankings.

Preferably, the ranking means 210 comprises a detector 211 for detecting whether the ranking next to that station's current ranking in the direction towards the other extreme of the rankings continues to be in use, and wherein the ranking means is responsive to a determination that such next ranking is not in use to re-allocate that next ranking to its station as the current ranking thereof.

What is claimed is:

1. A method of operating a data network having a bus and a plurality of stations operable to transmit data on the bus, comprising the steps of:
    assigning respective rankings to those stations which wish to transmit on the bus;
    performing by those stations which wish to transmit on the bus, a contention resolution process whereby those stations transmit in cycles;
    transmitting, by those stations which wish to transmit on the bus, within each cycle in an order determined from their ranking,
wherein the step of performing the contention resolution process comprises the steps of:
    transmitting a jam on the bus for up to a period of time dependent on the current ranking of that station; and
    detecting whether there is a collision on the bus while transmitting the jam; and
    if not, enabling transmission of data,
the method further comprising the step of making each station operable to perform a fairness process, which comprises the steps of:
    detecting whether one of the stations has transmitted data succeeding a jam
    without a collision; and
    if not, disabling its contention resolution process until such a detection has been made,
the method further comprising the step of:
    refraining by each station which wishes to transmit further data immediately after it has transmitted data in a current cycle, from the contention resolution process until it has determined that the current cycle has been completed.

2. A method as claimed in claim 1, wherein the fairness process of each station comprises the further steps of:
    detecting whether its contention resolution process has been disabled for a predetermined period of time; and
    if so, re-enabling its contention resolution process.

3. A method as claimed in claim 1, further comprising the step of fixing the ranking of each station.

4. A method as claimed in claim 1, wherein each station performs a ranking allocation process prior to an initial transmission on the bus, which comprises the steps of:
    determining, from the bus, rankings currently in use by the other station(s); and allocating to itself a current ranking to one extreme of the determined rankings.

5. A method as claimed in claim 4, wherein the ranking allocation process performed by each station comprises the further steps of:
    determining whether its current ranking is the same as that of the other station, or another of the stations; and
    if so, recommencing its ranking allocation process.

6. A method as claimed in claim 5, further comprising the step of waiting for a pseudo-random period of time before the recommencement of the ranking allocation process.

7. A method as claimed in claim 4, wherein the ranking allocation process performed by each station comprises the further steps of:
    detecting whether the ranking next to that station's current ranking in the direction towards the other extreme of the rankings continues to be in use; and
    if not, re-allocating to itself that next ranking as its current ranking.

8. A method as claimed in claim 1,
wherein the stations are high-priority stations, the method further comprising the step of:
    making at least one low-priority station operable to transmit data on the bus, the low-priority station(s) performing a different contention resolution process to the high-priority stations.

9. A method as claimed in claim 8, comprising the step of operating by the or each low-priority station, a carrier-sense multiple access with collision detection protocol.

10. A method as claimed in claim 8, comprising the steps of:
    making the or each low-priority station operable to perform a contention resolution process prior to transmission of data on the bus, the contention resolution process commencing when that station does not sense any activity on the bus, or a predetermined period of time after that station senses a transition from carrier to silence on the bus, or a predetermined period of time after that station has transmitted data; and
    making each high-priority station operable, immediately after transmission of data, to transmit a filler on the bus for a period of time exceeding said predetermined period(s) of time for the low-priority station(s).

11. A method as claimed in claim 10, comprising the step, by the or each low-priority station of ceasing transmission, at least temporarily, after transmission of data.

12. A method of operating a data network having a bus, and a plurality of high-priority stations and at least one low-priority station each operable to transmit data on the bus, comprising the steps of:
    making the or each low-priority station operable to perform a contention resolution process prior to transmission of data on the bus, the contention resolution process commencing when that station does not sense any activity on the bus, or a predetermined period of time after that station senses a transition from carrier to silence on the bus, or a predetermined period of time after that station has transmitted data; and making each high-priority station operable, immediately after transmission of data, to transmit a filler on the bus for a period of time exceeding said predetermined period(s) of tie for the low-priority station(s).

13. A method as claimed in claim 12, further comprising step of ceasing, by the or each low-priority station, transmission, at least temporarily, after transmission of data.

14. A method as claimed in claim 12, further comprising the step of operating, by the or each low-priority station, a carrier-sense multiple access with collision detection protocol.

15. A station for transmitting data over a data network having a bus, comprising:

storage means for storing a respective ranking for the station;

contention resolution means for performing a process whereby the station transmits with other stations in cycles, and within each cycle the station transmits in an order relative those other stations determined from its stored ranking; and disabling means for disabling said contention resolution means in the event that the station wishes to transmit further data immediately after it has transmitted data in a current cycle, until the current cycle has bee completed, wherein said contention resolution means comprises;

a transmitter for transmitting a jam on the bus for up to a period of time dependent on the current ranking of that station;

a detector for detecting whether there is a collision on the bus while said transmitter is transmitting the jam, and, if there is no collision, enabling transmission of data;

and wherein each station includes fairness means comprising a second detector for detecting whether a station on the network has transmitted data succeeding a jam without a collision, and, if not, for activating said disabling means until such a detection has been made.

16. A station as claimed in claim 15, wherein the fairness means further comprises:

a third detector for detecting whether the disabling means has been activated for a predetermined period of time, and if so de-activating it.

17. A station as claimed in claim 15, wherein the fairness means further comprises:

a third detector for detecting whether the disabling means has been activated for a predetermined period of time, and if so de-activating it.

18. A station as claimed in claim 17, wherein the ranking means comprises:

a detector for detecting whether the ranking next to that station's current ranking in the direction towards the other extreme of the rankings continues to be in use, and wherein the ranking means is responsive to a determination that such next ranking is not in use to re-allocate that next ranking to its station as the current ranking thereof.

* * * * *

UNITED STATES PATENT AND TRADEMARK OFFICE
CERTIFICATE OF CORRECTION

PATENT NO. : 6,272,147 B1
DATED : Agust 27, 2001
INVENTOR(S) : Michael Peter Spratt et al.

It is certified that error appears in the above-identified patent and that said Letters Patent is hereby corrected as shown below:

Column 11,
Line 13, change "until the current cycle has bee" to -- until the current cycle has been --

Column 12,
Line 18, replace claim 17 with the following:
-- A station as claimed in claim 15, wherein each station further comprises:
Ranking means for performing a ranking allocation process prior to an initial transmission on the bus, by determining, from the bus, rankings currently in use by other stations(s), and by allocating to its station a current ranking to one extreme of the determined rankings. --

Signed and Sealed this

Eighteenth Day of May, 2004

JON W. DUDAS
*Acting Director of the United States Patent and Trademark Office*